(12) United States Patent
Lee et al.

(10) Patent No.: US 9,239,504 B2
(45) Date of Patent: Jan. 19, 2016

(54) SWITCHABLE FRESNEL LENS AND FABRICATION METHOD THEREOF

(71) Applicants: LG DISPLAY CO., LTD., Seoul (KR); Chonbuk National University, Jeonju-si (KR)

(72) Inventors: Seunghee Lee, Jeonju-si (KR); Jounho Lee, Daegu (KR); Kyungki Kim, Gongju-si (KR); Sanghoon Oh, Changbuk-ri (KR)

(73) Assignees: LG DISPLAY CO., LTD., Seoul (KR); CHONBUK NATIONAL UNIVERSITY, Jeonju-Si (KR)

( * ) Notice: Subject to any disclaimer, the term of this patent is extended or adjusted under 35 U.S.C. 154(b) by 242 days.

(21) Appl. No.: 13/918,385

(22) Filed: Jun. 14, 2013

(65) Prior Publication Data

US 2014/0253832 A1 Sep. 11, 2014

(30) Foreign Application Priority Data

Mar. 8, 2013 (KR) .......................... 10-2013-0024895

(51) Int. Cl.
*G02F 1/1337* (2006.01)
*G02F 1/137* (2006.01)
*G02F 1/1343* (2006.01)
*G02F 1/29* (2006.01)

(52) U.S. Cl.
CPC .......... *G02F 1/137* (2013.01); *G02F 1/133788* (2013.01); *G02F 1/134309* (2013.01); *G02F 1/29* (2013.01); *G02F 2001/133742* (2013.01)

(58) Field of Classification Search
CPC ............................. G02F 1/29; G02F 2001/294
See application file for complete search history.

(56) References Cited

U.S. PATENT DOCUMENTS

2006/0164593 A1\* 7/2006 Peyghambarian et al. ... 349/200

\* cited by examiner

*Primary Examiner* — Phu Vu
(74) *Attorney, Agent, or Firm* — Brinks Gilson & Lione (57) ABSTRACT

A switchable Fresnel lens and a fabrication method thereof are disclosed. The switchable Fresnel lens comprises: an upper plate having a first electrode; a lower plate having a second electrode; and a lens cell comprising a liquid crystal layer sealed between the upper plate and the lower plate. The lens cell comprises a Fresnel lens formed by an electric field applied through the first and second electrodes, and having a discontinuous boundary. The lens cell comprises barrier ribs that are vertically formed between the upper plate and the lower plate at the discontinuous boundary of the Fresnel lens.

15 Claims, 10 Drawing Sheets

FIG. 1

(RELATED ART)

SWITCHABLE FRESNEL LENS AND FABRICATION METHOD THEREOF

This application claims priority to Korean Patent Application No. 10-2013-0024895, filed on Mar. 8, 2013, the entirety of which is hereby incorporated by reference herein.

BACKGROUND

1. Field

This document relates to a switchable Fresnel lens and a fabrication method thereof.

2. Discussion of the Related Art

As the stereoscopic image reproduction technology is applied to display devices, such as a television or a monitor, now is the age in which people can view 3D stereoscopic images even at home. A stereoscopic image display may be divided into a wearable glasses-type and a no glasses type. The glasses-type displays are configured to display left and right parallax images on a direct-view display or projector by changing polarization direction thereof or in a time-divisional manner. In this way, the glasses-type display implements a stereoscopic image using polarization glasses or liquid-crystal shutter glasses. For the no glasses type, the display may include optical parts, such as a parallax barrier and a lens, for separating the optical axes of left and right parallax images. In this way, the no glasses type of display may be installed in front of or behind a display screen.

Figure 1:
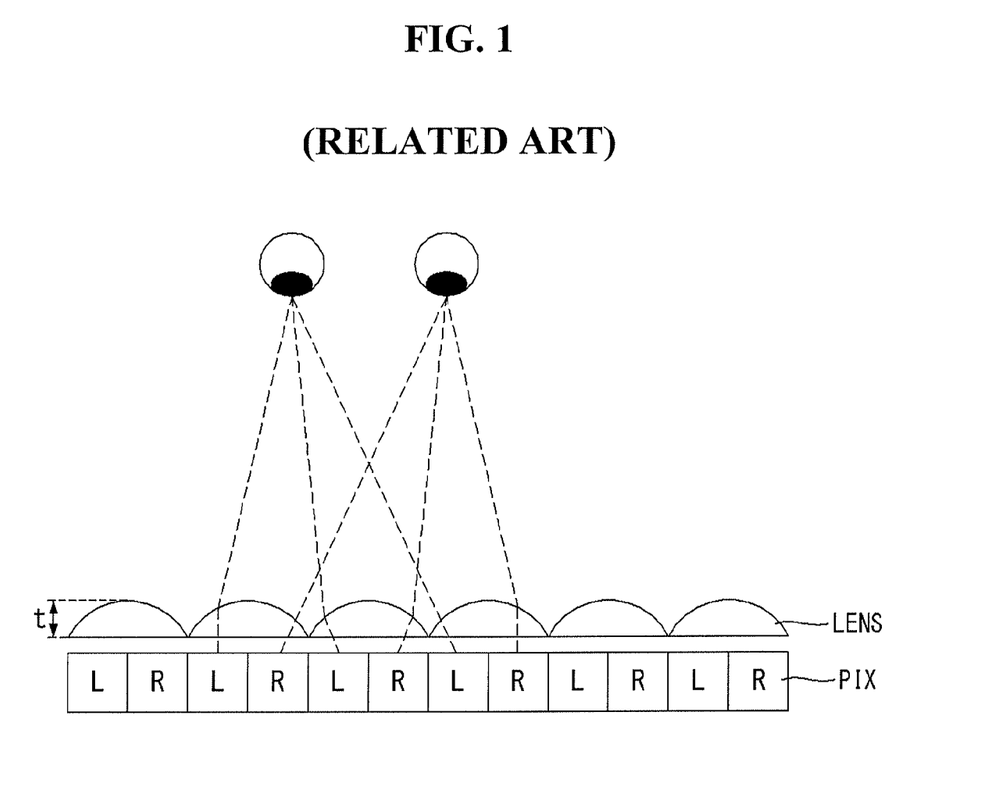
FIG. 1 shows an example of a no glasses type stereoscopic image display device using a lens.

FIG. 1 shows an example of a no glasses type stereoscopic image display device using a lens.

Referring to FIG. 1, the no glasses type stereoscopic image display device comprises a lens LENS placed in front of a pixel array PIX of a display panel. The lens LENS separates the optical axis of light from pixels to which a left-eye image L is written and the optical axis of light from pixels to which a right-eye image R is written. While the viewer sees the pixels with the left-eye image L written thereto, with the left eye through the lens LENS, the viewer sees the pixels with the right-eye image written thereto, with the right eye through the lens LENS, thus allowing the viewer to perceive a binocular parallax and view a stereoscopic image. The thickness t of the lens LENS having the structure shown in FIG. 1 is large.

The lens LENS is generally implemented as a convex lenticular lens array whose cross section is hemispherical or elliptical, as illustrated in FIG. 1. A method of implementing the lens LENS as a switchable lens sealed with liquid crystal has been recently proposed. The switchable lens is formed by applying an electric field to liquid crystal molecules through electrodes and changing the refractive index of the liquid crystal molecules, and makes it easy to switch between 2D mode and 3D mode by controlling the driving voltage applied to the electrodes. For example, the present applicants have proposed a switchable barrier and a switchable lens in U.S. patent application Ser. No. 13/077,565 (2011 Mar. 1) and Ser. No. 13/325,272 (2011 Dec. 14). However, even if the lens LENS is implemented as a switchable lens, a cell gap becomes thicker due to the thickness of the lens which is undesirable.

SUMMARY

The present invention has been made in an effort to provide a switchable Fresnel lens which can be made slim and a fabrication method thereof.

According to an aspect of the present invention a switchable lens structure is provided, comprising: an upper plate having a first electrode; a lower plate having a second electrode; and a lens cell comprising a liquid crystal layer sealed between the upper plate and the lower plate, wherein the lens cell is configured to be arranged in a lens formation based on an electric field generated in the lens cell based on the first electrode and second electrode.

According to another aspect of the present invention, a method of fabricating and operating a switchable lens is provided, the method comprising: forming an upper plate comprising a first electrode; forming a lower plate comprising a second electrode; forming a lens cell between the upper plate and the lower plate; generating an electric field in the lens cell such that a lens formation is arranged within the lens cell, wherein the lens formation is comprised of a plurality of lens portions that are separated by a discontinuous boundary.

According to another aspect of the present invention, a display device is provided, comprising: a display panel; a display panel driver configured to drive the display panel; a switchable lens configured to be placed above the display panel, the switchable lens including a lens cell layer; a lens panel driver configured to drive the switchable lens; and a timing controller configured to control a voltage supplied to the display panel driver and the lens panel driver, such that the timing controller supplies the voltage to the switchable lens in order to generate an electric field in the lens cell layer for a 3D mode, and the timing controller does not supply the voltage to the switchable lens for a 2D mode, wherein a lens formation is formed within the lens cell layer based on the electric filed generated in the lens cell layer for the 3D mode, wherein the lens formation is comprised of a plurality of lens portions that are separated by a discontinuous boundary.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5a to 5f are cross-sectional views showing in detail each step of the fabrication method of a lens for a stereoscopic image display device of FIG. 4;

DETAILED DESCRIPTION

Hereinafter, exemplary embodiments of the present invention will be described with reference to the drawings. Throughout the specification, like reference numerals denote substantially like components. The present invention as described herein may be embodied in a number of different forms. Variations in the arrangement and type of the components may be made without departing from the spirit or scope of the claims as set forth herein.

An exemplary stereoscopic image display device of the present invention may be implemented as a flat panel display such as a liquid crystal display (LCD), a field emission display (FED), a plasma display panel (PDP), an organic light emitting diode (OLED), an electrophoresis display (EPD), or other similar type of display. The stereoscopic image display device of the present invention may be implemented as a no glasses type stereoscopic image display device using a switchable Fresnel lens. The stereoscopic image display device of the present invention displays 2D image data in a 2D mode and 3D image data in a 3D mode.

Figure 2:
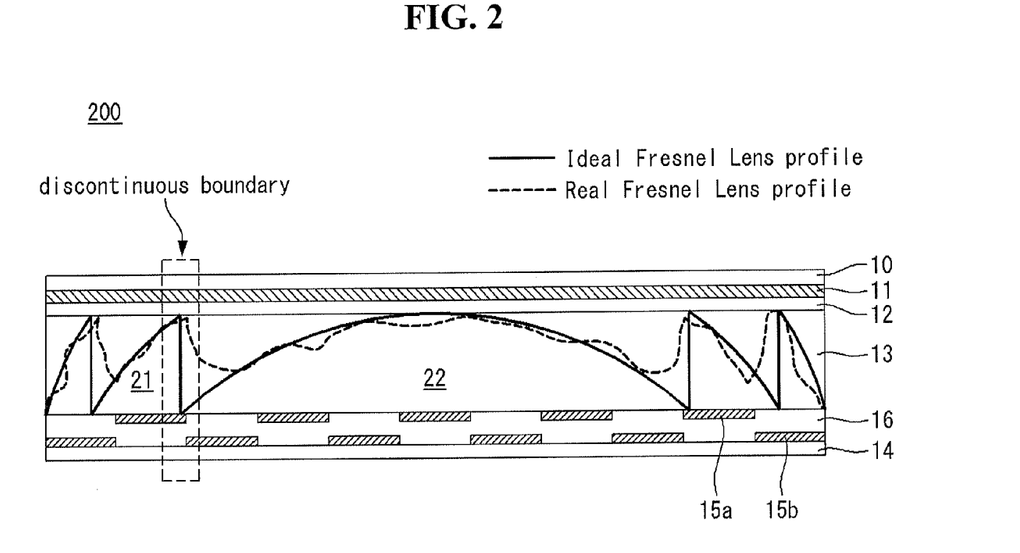
FIG. 2 is a cross-sectional view showing a switchable Fresnel lens according to an exemplary embodiment of the present invention.
Figure 3:
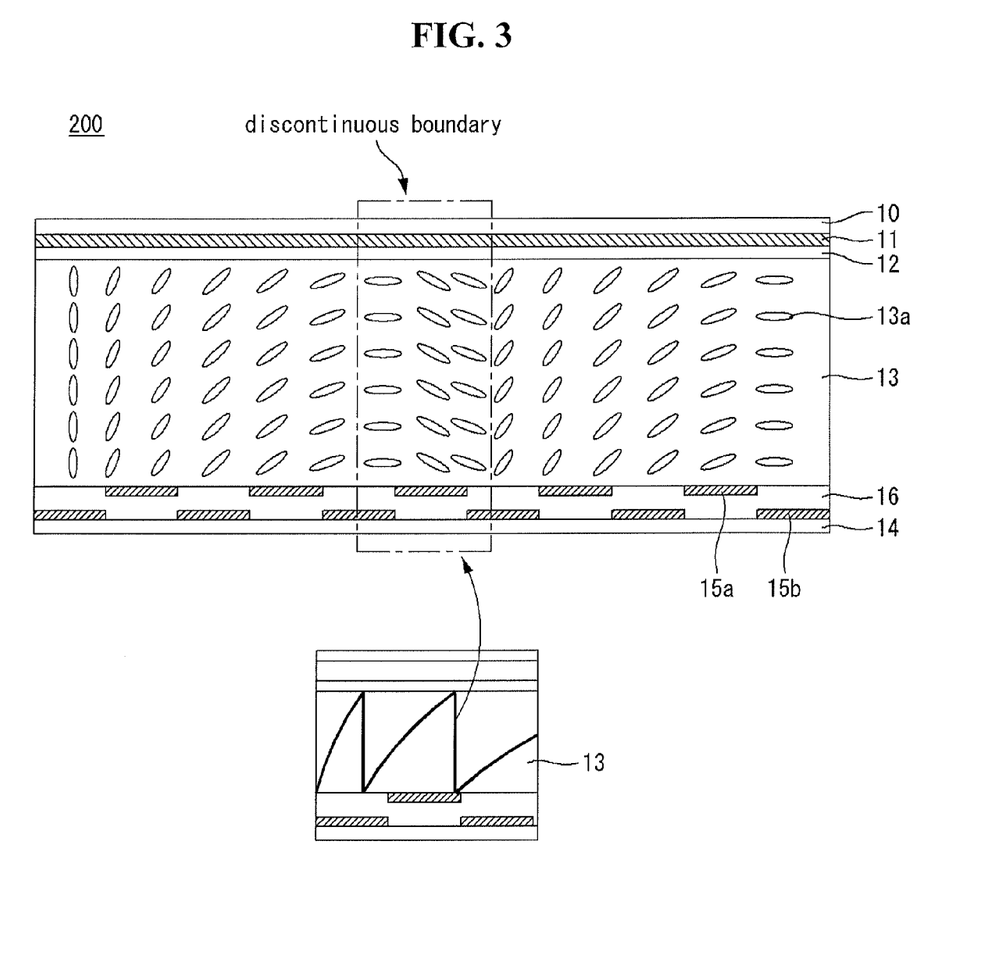
FIG. 3 is an enlarged cross-sectional view showing an boundary between concentric circles of the switchable Fresnel lens of FIG. 2.

Referring to FIGS. 2 and 3, the switchable Fresnel lens 200 of the present invention may be comprised of a lens cell 13 formed between an upper plate and a lower plate. The upper plate may be comprised of a first transparent substrate 10, a first electrode 11 formed on the first transparent substrate 10, and a first alignment film 12. A common voltage set to a given DC voltage may be applied to the first electrode 11. The lower plate may be comprised of a second transparent substrate 14, a second electrode 15a and 15b formed on the second transparent substrate 14, and a second alignment film. The second alignment film is omitted in the drawings. The alignment films set a pre-tilt angle of liquid crystal molecules within the lens cell 13. The second electrode 15a and 15b may be divided into upper electrodes 15a and lower electrodes 15b that are within the insulation layer 16. Driving voltages may be individually applied to the upper electrodes 15a and the lower electrodes 15b so that the liquid crystal molecules in the lens cell 13 are arranged in a Fresnel lens profile. The liquid crystal molecules may be driven by an electric field formed by the voltage applied to the first electrode 11 and the second electrode 15a and 15b, and rotate at a greater angle in proportion to the strength of the electric field, thereby realizing the Fresnel lens as shown in FIGS. 2 and 3.

The Fresnel lens may be realized by dividing the lens of FIG. 1 into concentric circles and placing them on a planar surface. The Fresnel lens formed in the lens cell 13 separates the optical axis of light of a left-eye image and the optical axis of light of a right-eye image. The liquid crystal molecules of the lens cell 13 are arranged in a Fresnel lens profile. The Fresnel lens minimizes cell gaps of the lens cell 13 without deterioration in lens performance. For example, FIG. 2 illustrates liquid crystal molecules arranged into an exemplary Fresnel lens profile. The exemplary Fresnel lens profile is comprised of a plurality of lens portions that are separated by a discontinuous boundary. In this way, a first lens portion 21 and a second lens portion 22 are separated by the labeled discontinuous boundary, where the discontinuous boundary is a vertical edge.

The refractive index of liquid crystal abruptly changes on the boundary between the concentric circles divided from the Fresnel lens. Accordingly, in order to realize the Fresnel lens within the lens cell 3, a discontinuous boundary may be formed where the effective refractive index of the liquid crystal abruptly changes. However, it is difficult to abruptly change the refractive index of the liquid crystal only at a particular portion in the lens cell 13, due to the collective behavior caused by a continuum characteristic of the liquid crystal, by which neighboring liquid crystal molecules behave in the same way. The thick solid line of FIG. 2 represents an ideal Fresnel lens profile. The dotted line of FIG. 2 represents a real Fresnel lens profile that may be achievable.

Since the refractive index of the liquid crystal changes irregularly on the boundary between the concentric circles of the Fresnel lens due to the continuum characteristic of the liquid crystal, as indicated by the dotted line of FIG. 2, it is difficult to realize the ideal Fresnel lens. When the refractive index slowly changes on the discontinuous boundary, crosstalk may occur to the stereoscopic image display device when the left-eye image and the right-eye image bleed into each other.

Figure 4:
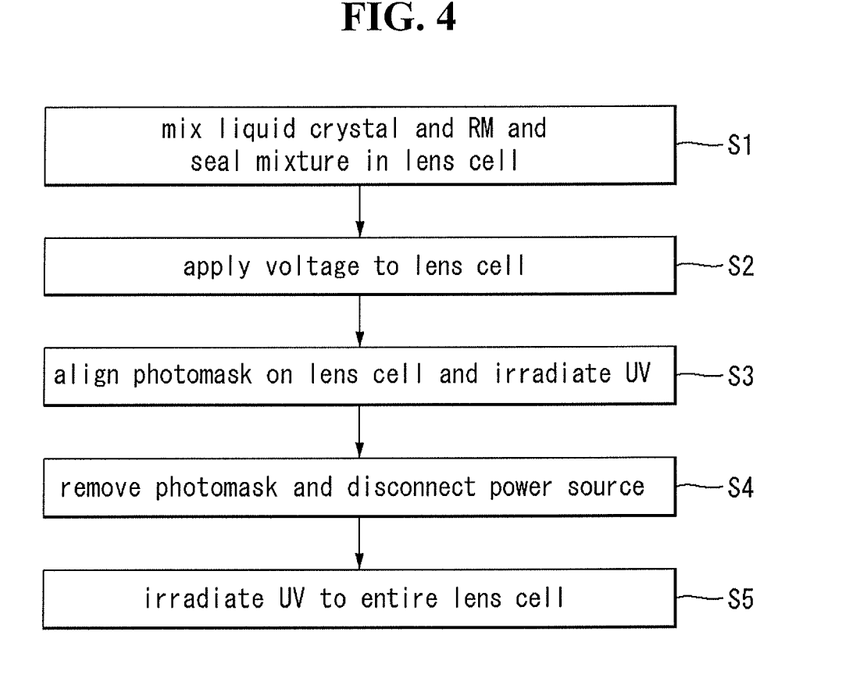
FIG. 4 is a flowchart showing in steps a fabrication method of a switchable Fresnel lens according to an exemplary embodiment of the present invention.

In the present invention, in order to realize the ideal Fresnel lens, a switchable Fresnel lens 200 may be fabricated in the method shown in FIGS. 4 and 5.

FIG. 4 is a flowchart illustrating steps of a fabrication method of a switchable Fresnel lens 200 according to an exemplary embodiment of the present invention. FIGS. 5a to 5f are cross-sectional views showing in detail steps of the exemplary fabrication method of a lens for a stereoscopic image display device of FIG. 4.

Referring to FIGS. 4 and 5, in the present invention, liquid crystal 13a and reactive mesogens (RM) 13b are mixed together and sealed in the lens cell 13 between the upper plate and the lower plate.

The reactive mesogens 13b are liquid crystalline materials that include polymerizable end groups, which are monomer molecules having a liquid crystal phase by including a mesogen which has a liquid crystalline property and polymerizable end groups. For example, polymerizable acrylates or metacrylate groups may be used as polymerizable end groups. However, any polymerizable functional groups may be used as the end groups. When polymerization is initiated upon exposure to light, the reactive mesogens 13 form a cross-linked polymer network with the liquid crystal molecules 13a while maintaining the alignment state of the liquid crystal. Such a liquid crystalline cross-linked network is stable both mechanically and thermally because it has a substantial solid structure while having liquid crystal characteristics, such as optical anisotropy and a dielectric constant.

In some embodiments, RM257 may, for example, be used as the reactive mesogens 13b. The reactive mesogens 13b may be mixed with the liquid crystal 13a at the ratio of about 1 to 30 wt % of reactive mesogens to 100 wt % of liquid crystal. Here, about 1 wt % of light initiator to the reactive mesogens 13b may be mixed with the liquid crystal 13a. In some embodiments, Irgacure651 may, for example, be selected as the optical initiator. According to a test result, when 0.5 wt % or less of reactive mesogens 13b was added, a cross-linked network was not sufficiently formed between the reactive mesogens 13b and the liquid crystal molecules 13a when UV rays were irradiated to the lens cell 123 after application of a vertical electric field to the lens cell 123 in a subsequent process. Hence, the lens cell 123 showed little change before and after UV irradiation. When 1 wt % or more of reactive mesogens 13b was added to the liquid crystal, the liquid crystal 13a was light-cured as it formed a cross-linked network with the reactive mesogens 13b after UV irradiation, and a luminance change was observed at the light-cured part. Also, it was found that the liquid crystal molecules have a tilt angle when 1 wt % or more of reactive mesogens 13b is added to the liquid crystal. When wt % of reactive mesogens 13b was added, the liquid crystal molecules had a tilt angle of about 73°.

Figure 5A:
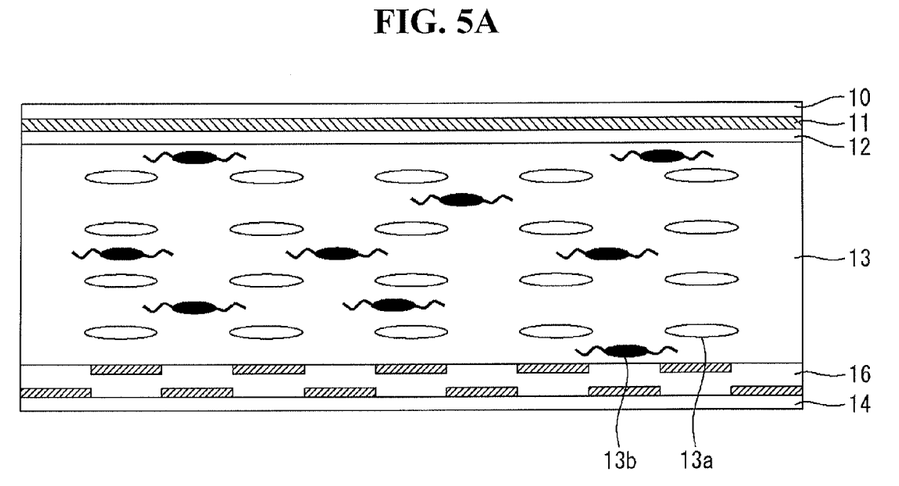
Figure 5B:
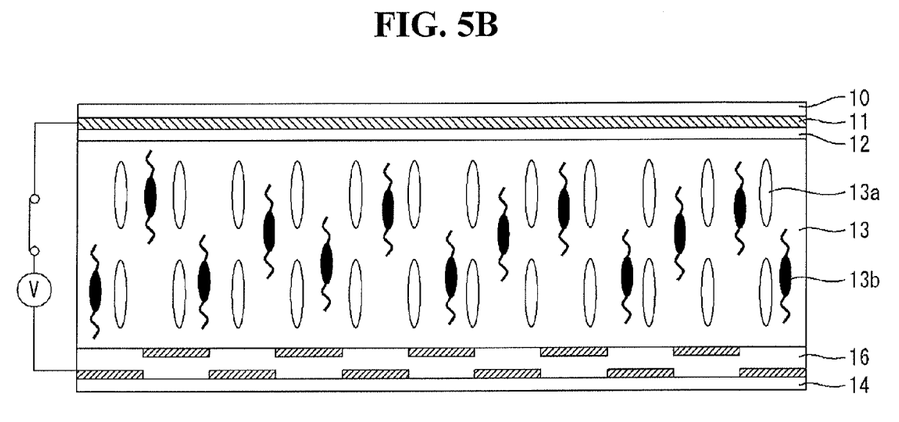
Figure 5C:
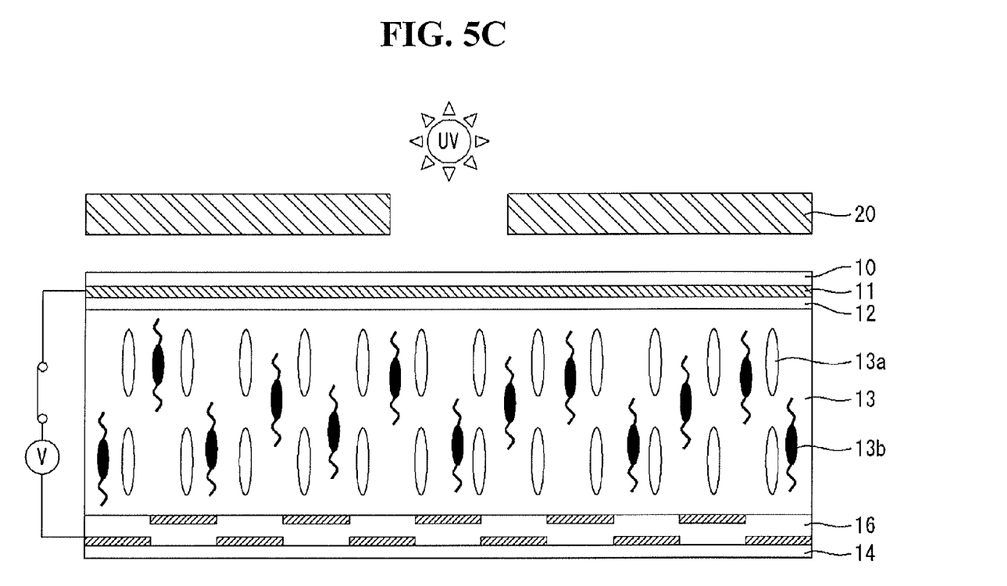

In step S2, as shown in FIGS. 4 and 5b, a power source V is connected to the electrodes 11, 15a, and 15b, and a vertical electric field is applied to the liquid crystal molecules 13a and reactive mesogens 13b of the lens cell 13 to vertically align the liquid crystal molecules 13a. Next, in step S3, as shown in FIGS. 4 and 5c, a photomask 20 is aligned on the lens cell 13, and UV rays are irradiated to the lens cell 13 through the photomask 20. A light transmitting portion of the photomask 20 corresponds to the discontinuous boundary of the Fresnel lens. A UV-exposed portion of the lens cell 13 is polymer-stabilized as the reactive mesogens 13b and the liquid crystal 13a are photopolymerized to form a cross-linked network. As a result, the vertically-aligned liquid crystal molecules 13a are solidified at the discontinuous boundary of the Fresnel lens, thus forming barrier ribs 13c. The barrier ribs 13c are vertically formed between the upper plate and lower plate of the switchable Fresnel lens 200.

Figure 5D:
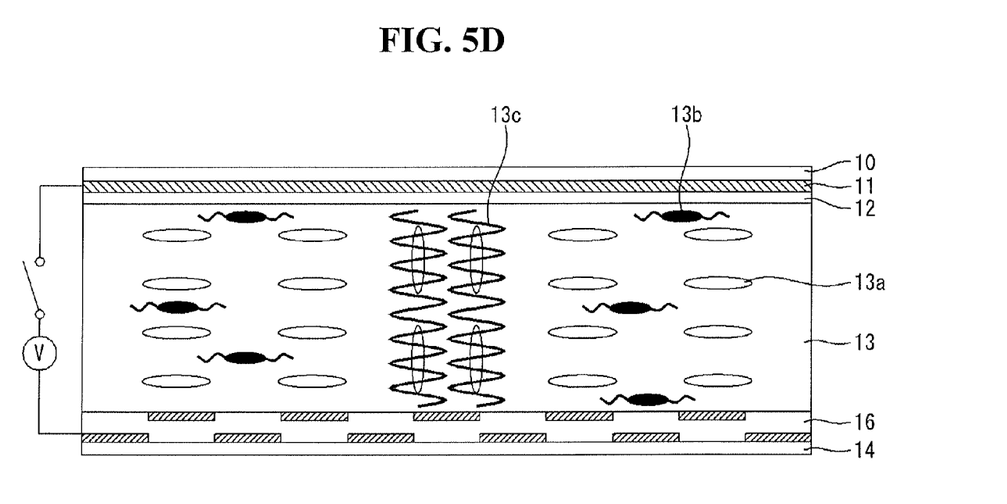
Figure 5E:
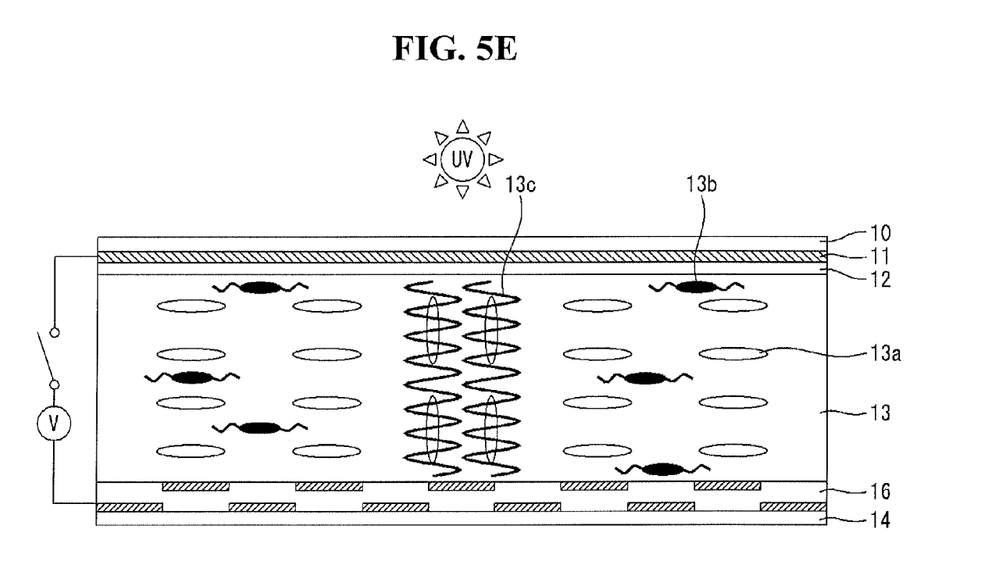
Figure 5F:
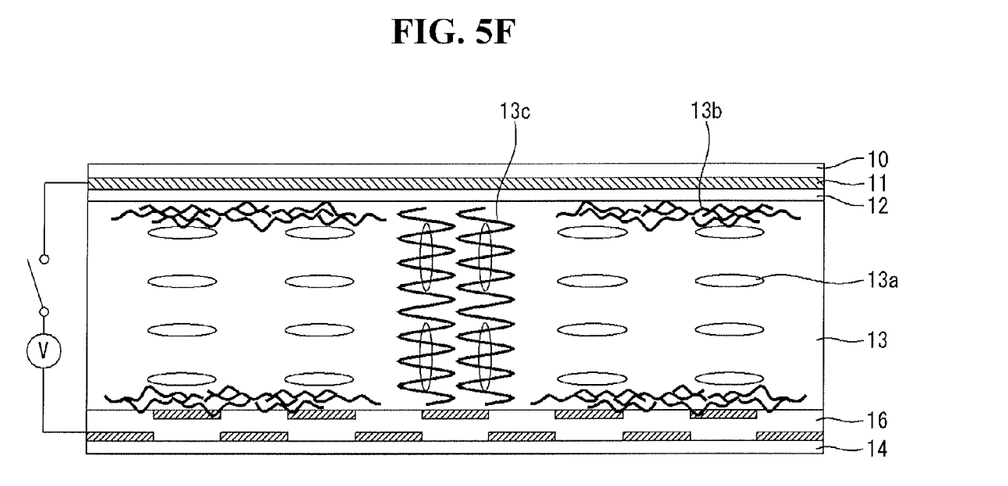

In steps S4 and S5, as shown in FIGS. 4, 5d, and 5f, after removing the power source V connected to the electrodes 11, 15a, and 15b, UV rays are irradiated to the entire lens cell 13. In step S5, as illustrated in FIG. 5E, if UV rays are irradiated once more to the entire surface of the lens cell 13, the remaining reactive mesogens 13b are transferred to the surfaces of the alignment films and form a thin layer. The thus-formed reactive mesogen layer contributes to increase the anchoring energy and makes the alignment of the liquid crystal more stable.

Figure 6:
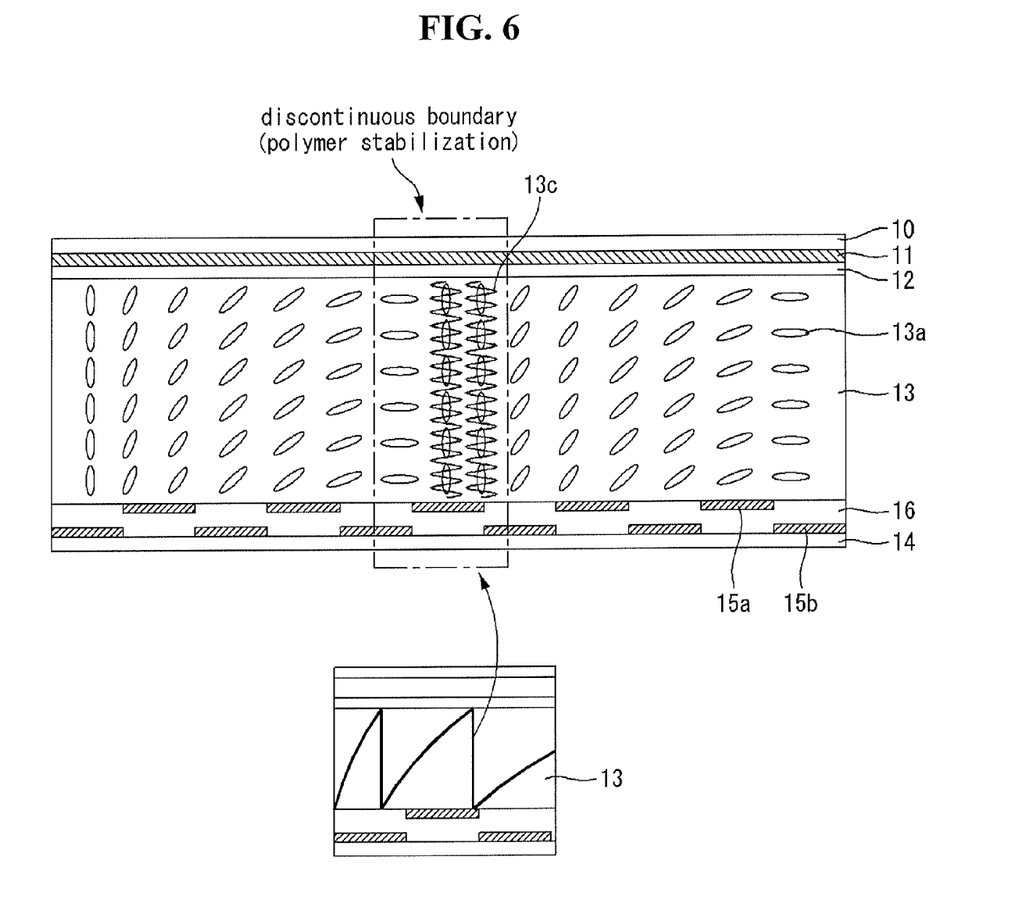
FIG. 6 is a cross-sectional view showing barrier ribs formed at the discontinuous boundary of the switchable Fresnel lens.
Figure 7:
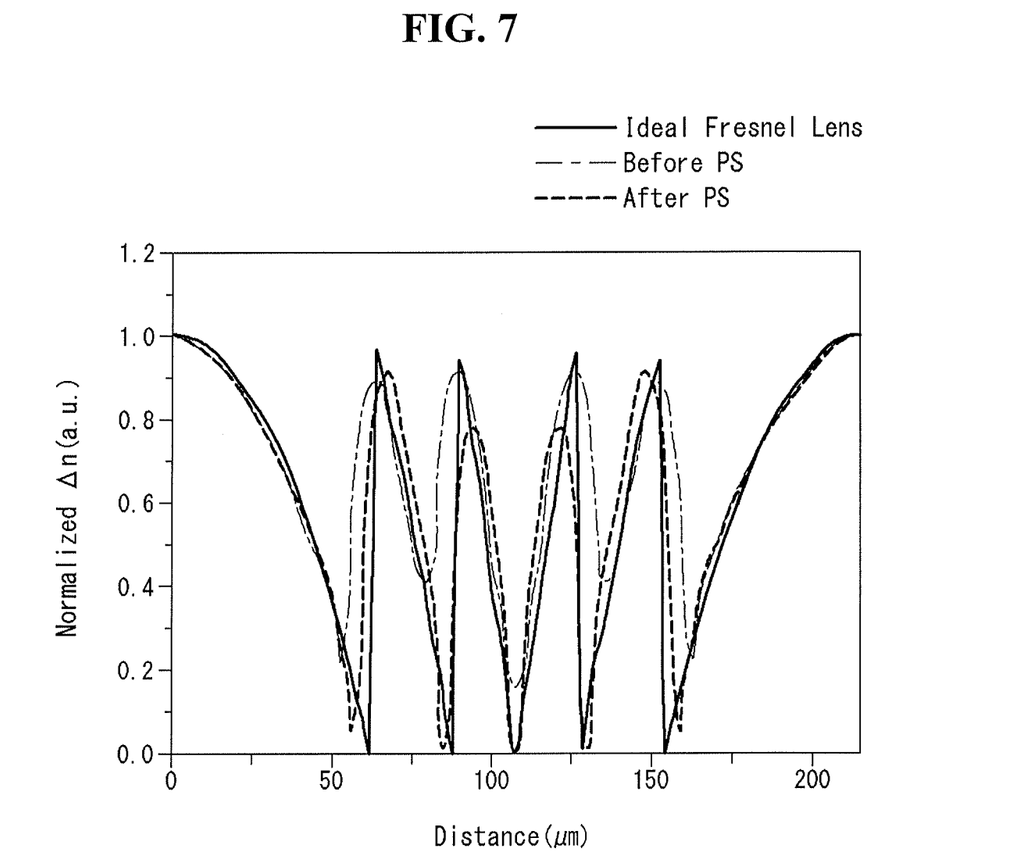
FIG. 7 is a view showing simulation data of the switchable Fresnel lens according to the present invention.

FIG. 6 is a cross-sectional view showing barrier ribs 13c formed at the discontinuous boundary of the switchable Fresnel lens 200. FIG. 7 is a view showing simulation data of the switchable Fresnel lens 200.

Referring to FIGS. 6 and 7, the liquid crystal molecules 13a in the barrier ribs 13c are vertically aligned and solidified. Even if an electric field is applied into the lens cell 14, the liquid crystal molecules 13a in the barrier ribs 13c are not driven. The refractive index of the liquid crystal molecules abruptly changes in the barrier ribs 13c. Accordingly, as shown in FIG. 7, refractive index properties similar to the ideal Fresnel lens may be obtained. In FIG. 7, the transverse axis denotes distance (μm), and the longitudinal axis denotes Angstrom unit (A.U.). In FIG. 7, "After PS" denotes a test sample which has the barrier ribs 13c formed in the lens cell 13 by polymer stabilization using the reactive mesogens 13b, and "Before PS" denotes a test sample which did not undergo polymer stabilization.

Figure 8:
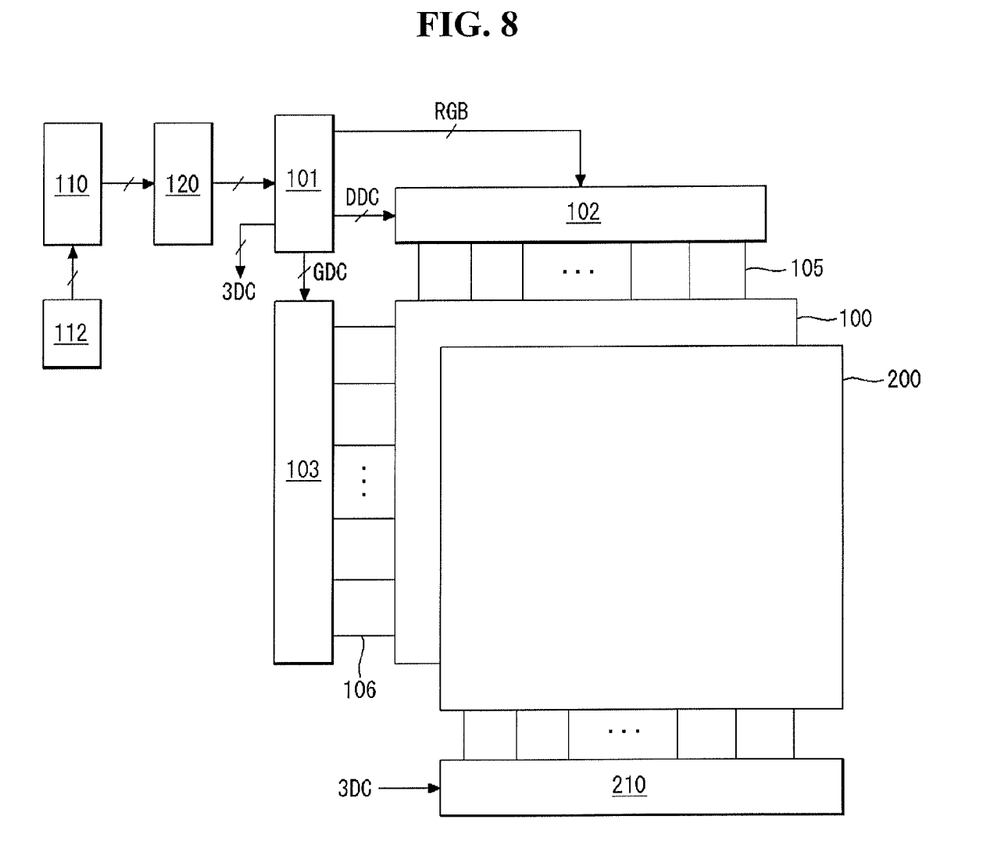
FIG. 8 is a block diagram showing a stereoscopic image display device according to an exemplary embodiment of the present invention.

FIG. 8 is a block diagram showing an exemplary stereoscopic image display device according to the present invention.

Referring to FIG. 8, the stereoscopic image display device of the present invention may comprise a display panel 100, a display panel driver, a switchable Fresnel lens 200, a lens cell driver 210, and a timing controller 101.

The display panel comprises data lines 105 and gate lines (or scan lines) 106 crossing each other and a pixel array in which pixels are disposed in a matrix form. Each of the pixels may comprise subpixels of different colors. The pixel array displays a 2D image in the 2D mode and displays a left-eye image and a right-eye image in the 3D mode.

The display panel driver comprises a data driving circuit 102 and a gate driving circuit 103. In the 3D mode, the display panel driver spatially distributes and writes left-eye and right-eye image data into the pixels of the display panel 100.

The data driving circuit 102 converts digital video data input from the timing controller 101 into an analog gamma voltage to generate data voltages, and supplies the data voltages to the data lines 105 of the display panel 100. The gate driving circuit 103 supplies the gate pulses (or scan pulses) synchronized with the data voltages supplied to the data lines 105 to the gate lines 106 under control of the timing controller 101, and sequentially shifts the scan pulses.

A switchable Fresnel lens 200 is fabricated in the method shown in FIGS. 4 and 5. Barrier ribs 13c are formed at a discontinuous boundary of the switchable Fresnel lens 200. A Fresnel lens is formed within the lens cell 13 by an electric field applied to the lens cell 13 in the 3D mode. The Fresnel lens separates the optical axis of light from pixels to which left-eye image data is written and the optical axis of light from pixels to which right-eye image data is written. No Fresnel lens is formed within the lens cell 13 of the switchable Fresnel lens 200 because no electric field is applied to the lens cell 13 in the 2D mode. Accordingly, while the switchable Fresnel lens 200 separates the optical axis of the left-eye image and the optical axis of the right-eye image and realizes a stereoscopic image in the 3D mode, it allows incident light to be directly transmitted and realizes a second-dimensional planar image in the 2D mode.

The lens cell driver 210 is synchronized with pixel data written in the pixel array of the display panel 100 in the 3D mode under control of the timing controller 101 to supply power to the electrodes of the switchable Fresnel lens 200 and realize the Fresnel lens.

The timing controller 101 supplies digital video data RGB of a 2D/3D input image input from the host system 110 to the data driving circuit 102. Also, the timing controller 101 receives timing signals such as a vertical synchronization signal, a horizontal synchronization signal, a data enable signal, and a main clock, input from the host system 110 in synchronization with the digital video data of the 2D/3D input image. The timing controller 101 generates timing control signals for controlling operation timings of the display panel drivers 102 and 103 and the lens cell driver 210 by using the received timing signals, and controlling the operation timings of these drivers to be synchronized with each other. The timing control signals comprise a source timing control signal DDC for controlling the operation timing of the data driving circuit 102, a gate timing control signal GDC for controlling the operation timing of the gate driving circuit 103, and a lens cell control signal 3DC.

The timing controller 101 can control the operating frequency of the display panel driver 102 and 103 and the lens cell driver 210 at a frame rate obtained by multiplying the frame rate of an input image by N Hz (N is a positive integer equal to or greater than 2). The frame frequency of the input image is 60 Hz for NTSC (National Television Standards Committee) and 50 Hz for PAL (Phase-Alternating Line).

A 3D data formatter 120 may be installed between the host system 110 and the timing controller 101. The 3D data formatter 120 realigns left-eye image data and right-eye image data of a 3D image input from the host system 110 in the 3D mode in accordance with the pixel array of the display panel, and supplies it to the timing controller 101. When 2D image data is input in the 3D mode, the 3D data formatter 120 may execute a preset 2D-3D image conversion algorithm to generate left-eye image data and right-eye image data from the 2D image data, realigns the data, and transmits it to the timing controller 101.

The host system 110 may be implemented as any of the following: a TV (television) system, a set-top box, a navigation system, a DVD player, a Blue-ray player, a personal computer (PC), a home theater system, a broadcast receiver, and a phone system. The host system 110 uses a scaler to convert digital video data of a 2D/3D input image into a format appropriate for the resolution of the display panel PNL 100 and transmit a timing signal, along with the data, to the timing controller 101.

The host system 110 supplies a 2D image to the timing controller 101 in the 2D mode, and supplies a 3D or 2D image data to the 3D data formatter 120 in the 3D mode. The host system 110 may transmit a mode signal to the timing controller 101 in response to user data input through a user interface 112 to control the stereoscopic image display device in the 2D mode and the 3D mode. The user interface 112 may be implemented as a keypad, a keyboard, a mouse, an on-screen display (OSD), a remote controller, a graphic user interface (GUI), a touch user interface (UI), a voice recognition UE, or a 3D UI. The user may select between the 2D mode and the 3D mode through the user interface 112, and select 2D-3D image conversion in the 3D mode.

As described above, the present invention makes the switchable Fresnel lens slim by forming a Fresnel lens within a lens cell comprising a liquid crystal layer.

Moreover, the fabrication method of the switchable Fresnel lens in accordance with the present invention forms barrier ribs at the discontinuous boundary of the Fresnel lens within the lens cell by polymer stabilization using a photopolymerization reaction between liquid crystal and reactive mesogens (RM). As a result, the present invention makes it possible to realize a Fresnel lens close to an ideal Fresnel lens profile, within the lens cell of the switchable Fresnel lens, thereby improving the picture quality of 3D images without crosstalk.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A switchable lens structure comprising:
an upper plate having a first electrode;
a lower plate having a second electrode; and
a lens cell comprising a liquid crystal layer sealed between the upper plate and the lower plate,
wherein the lens cell is configured to be arranged in a lens formation based on an electric field generated in the lens cell based on the first electrode and second electrode,
wherein the lens formation includes a plurality of lens portions separated by a discontinuous boundary having liquid crystal molecules.

2. The switchable lens structure of claim 1, wherein the discontinuous boundary includes liquid crystal molecules that are always vertically aligned regardless of the electric field applied to the discontinuous boundary.

3. A switchable lens structure comprising:
an upper plate having a first electrode;
a lower plate having a second electrode; and
a lens cell comprising a liquid crystal layer sealed between the upper plate and the lower plate,
wherein the lens cell is configured to be arranged in a lens formation based on an electric field generated in the lens cell based on the first electrode and second electrode,
wherein the discontinuous boundary of the lens formation is comprised of barrier ribs that are formed vertically between adjacent lens portions within the lens cell.

4. The switchable lens structure of claim 3, wherein the lens portions of the lens formation are comprised of reactive mesogens and liquid crystal molecules.

5. The switchable lens structure of claim 3, wherein the discontinuous boundary of the lens formation is further comprised of liquid crystal molecules that are vertically aligned within the barrier ribs.

6. The switchable lens structure of claim 5, wherein the discontinuous boundary of the lens formation is further comprised of reactive mesogens that are cross-linked to the liquid crystal molecules within the barrier ribs.

7. The switchable lens structure of claim 5, wherein an alignment film is formed on each of the upper and lower plates, and a reactive mesogen film is formed only on the alignment films in the regions other than the barrier ribs.

8. The switchable lens structure of claim 1, wherein the lens formation within the lens cell is configured in a Fresnel lens configuration.

9. The switchable lens structure of claim 1, wherein liquid crystal molecules in the lens cell that are not within the discontinuous boundary are configured to be adjustable based on the electric field generated in the lens cell.

10. The switchable lens structure of claim 9, wherein the electric field is generated during a 3D mode, and the electric field is not generated during a 2D mode.

11. A display device, comprising:
a display panel;
a display panel driver configured to drive the display panel;
a switchable lens configured to be placed above the display panel, the switchable lens including a lens cell layer;
a lens panel driver configured to drive the switchable lens; and
a timing controller configured to control a voltage supplied to the display panel driver and the lens panel driver, such that the timing controller supplies the voltage to the switchable lens in order to generate an electric field in the lens cell layer for a 3D mode, and the timing controller does not supply the voltage to the switchable lens for a 2D mode,
wherein a lens formation is formed within the lens cell layer based on the electric filed generated in the lens cell layer for the 3D mode, wherein the lens formation is comprised of a plurality of lens portions that are separated by a discontinuous boundary having liquid crystal molecules.

12. The display device of claim 11, wherein the lens portions of the lens formation are comprised of reactive mesogens and liquid crystal molecules.

13. The display device of claim 11, wherein the discontinuous boundary includes liquid crystal molecules that are always vertically aligned regardless of the electric field applied to the discontinuous boundary.

14. The display device of claim 13, wherein the discontinuous boundary of the lens formation is comprised of liquid crystal molecules that are vertically aligned in barrier ribs that are formed vertically between adjacent lens portions within the lens cell layer.

15. The display device of claim 13, wherein the lens formation within the lens cell layer is configured in a Fresnel lens configuration.

* * * * *